July 9, 1935.  E. S. GOODSPEED  2,007,602
ELECTRIC WELDING HEAD
Filed June 19, 1930   5 Sheets-Sheet 1

Inventor
Elvin S. Goodspeed
By Blackmore, Spencer & Hirsh
Attorneys

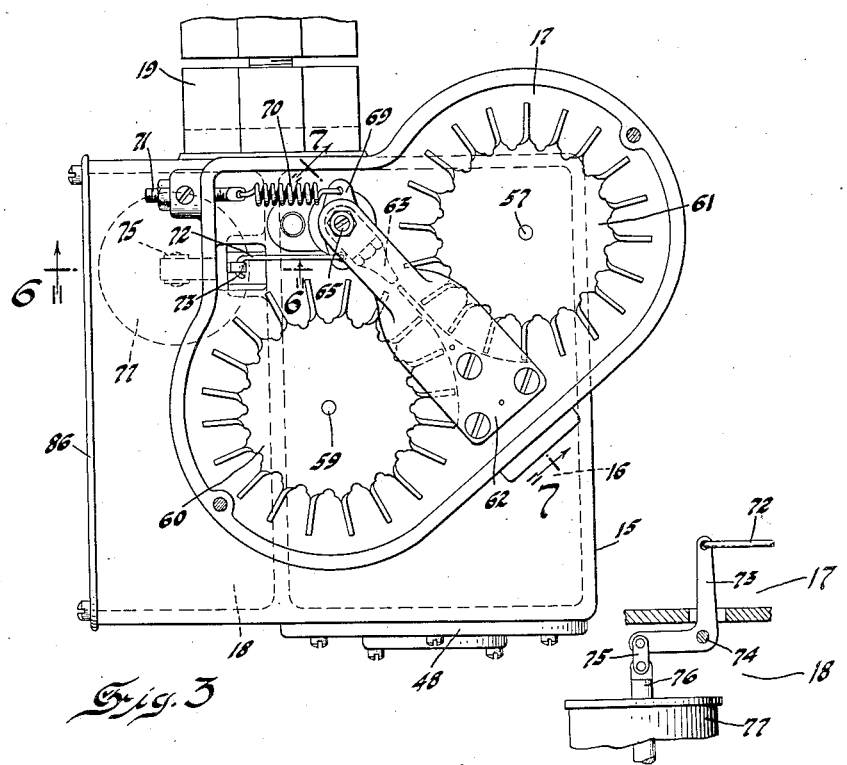

July 9, 1935. E. S. GOODSPEED 2,007,602
ELECTRIC WELDING HEAD
Filed June 19, 1930 5 Sheets-Sheet 3
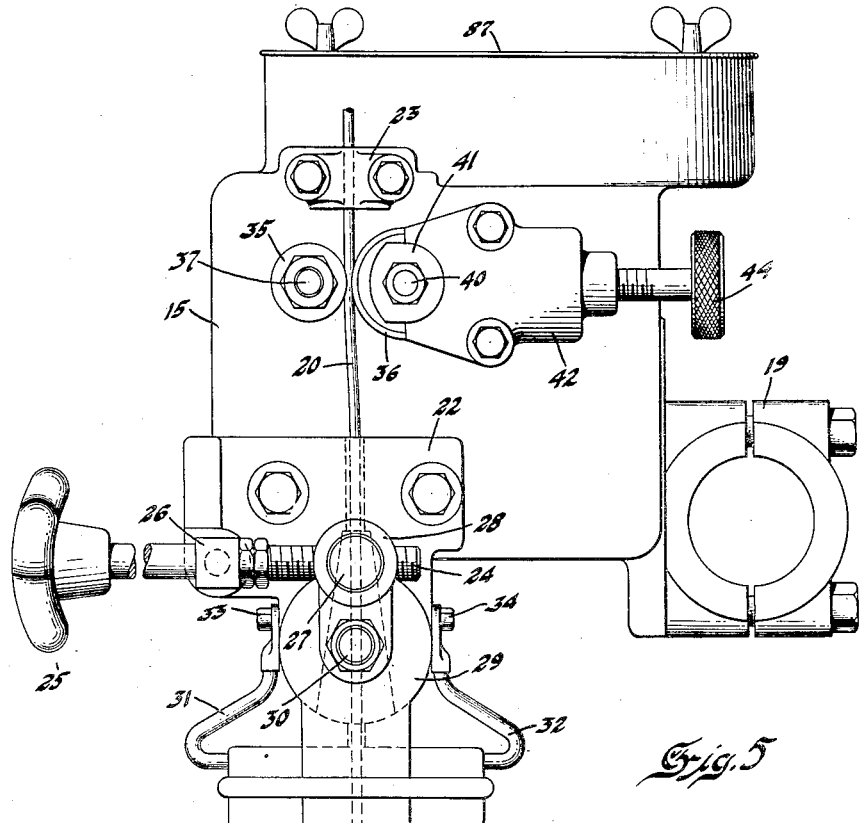
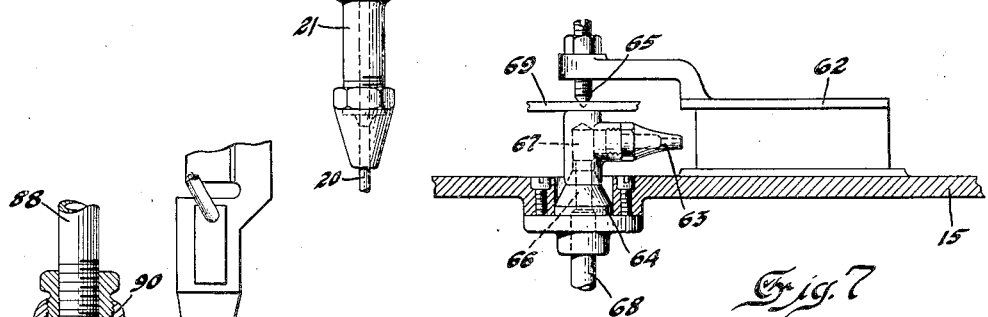
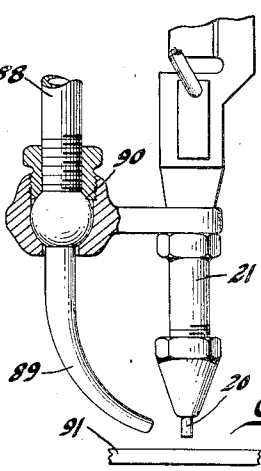
Inventor
Elvin S. Goodspeed July 9, 1935.  E. S. GOODSPEED  2,007,602
ELECTRIC WELDING HEAD
Filed June 19, 1930   5 Sheets-Sheet 4
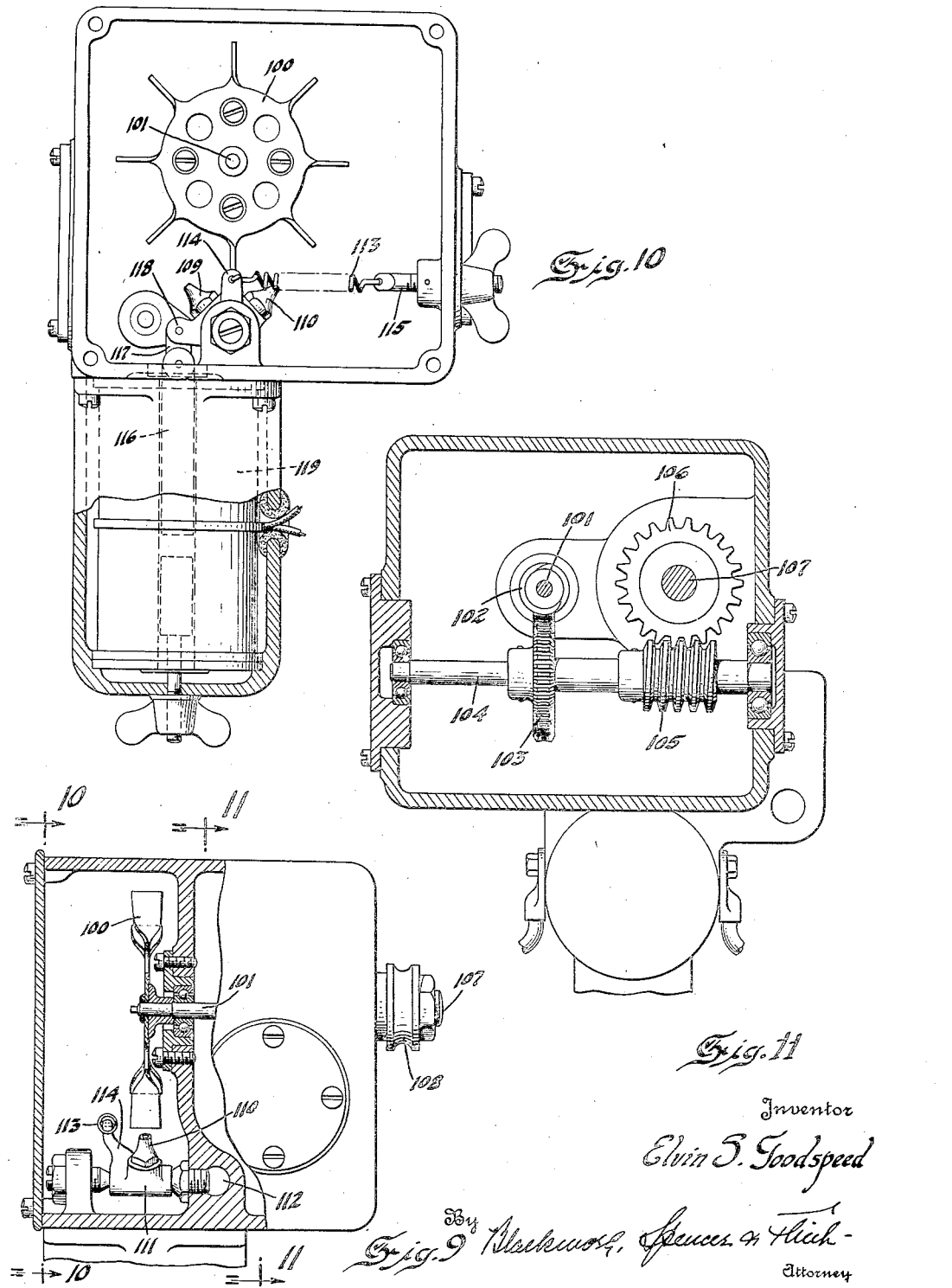
Inventor
Elvin S. Goodspeed
By Blackmore, Spencer & Hick
Attorney July 9, 1935.  E. S. GOODSPEED  2,007,602
ELECTRIC WELDING HEAD
Filed June 19, 1930   5 Sheets-Sheet 5
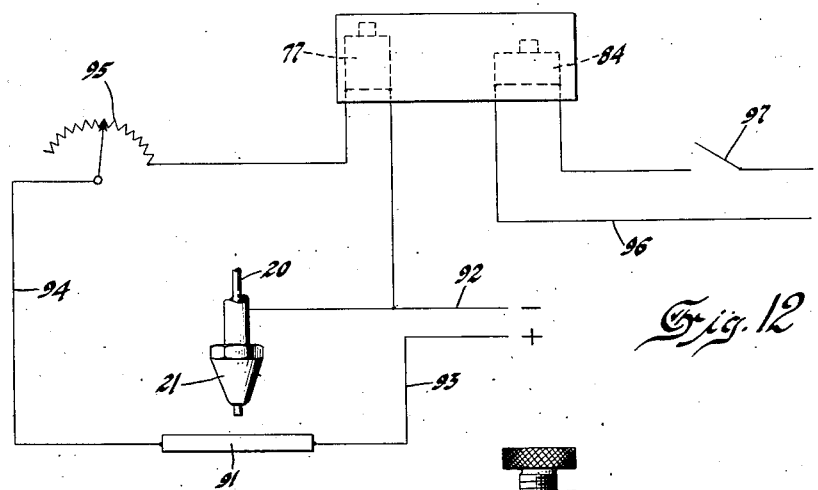
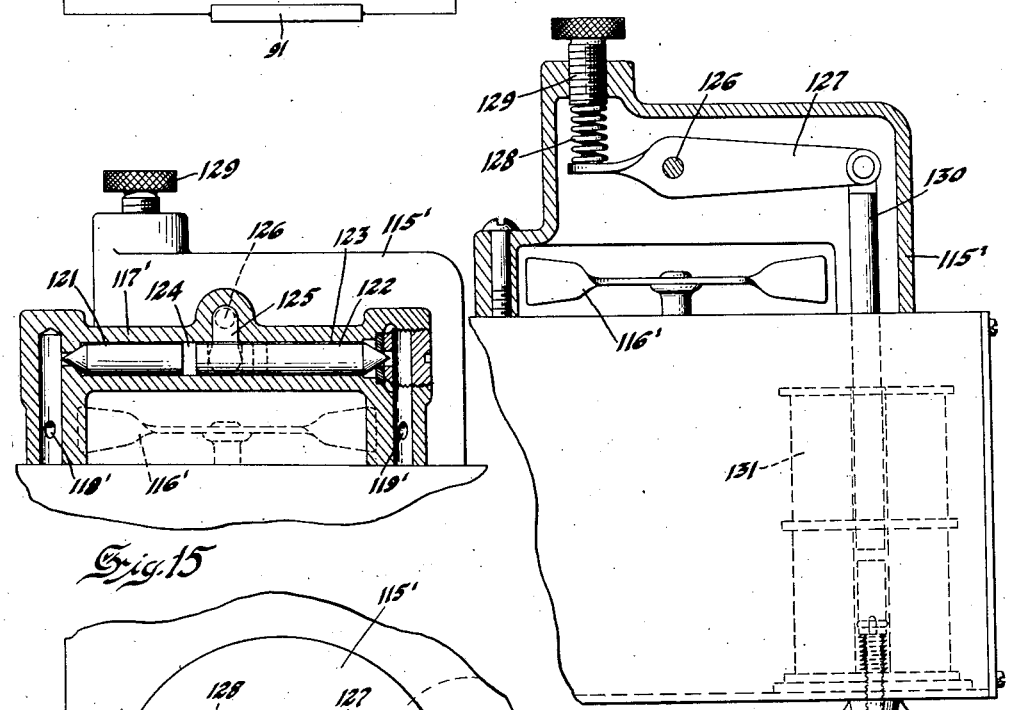
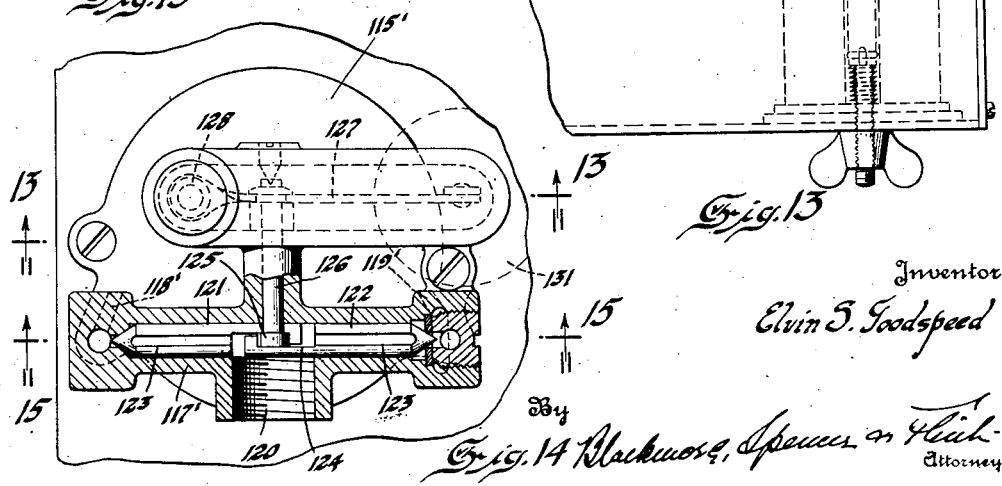
Inventor
Elvin S. Goodspeed
By Blackmore, Spencer & Hill
Attorneys Patented July 9, 1935

2,007,602

UNITED STATES PATENT OFFICE 2,007,602

ELECTRIC WELDING HEAD

Elvin S. Goodspeed, Detroit, Mich., assignor to General Motors Corporation, Detroit, Mich., a corporation of Delaware Application June 19, 1930, Serial No. 462,237

12 Claims. (Cl. 219—8)

This invention relates to feeding mechanism and while in some respects of more general application, it has been particularly designed for and will be herein described as applied to the feeding of metallic electrode material to a welding arc. To this end the invention comprises, in the specific embodiments herein disclosed, means for supplying continuously to an electric arc a rod or wire of fusible electrode material, the angular position of the electrode with reference to the work being to some extent adjustable, pneumatic motor mechanism together with suitable gearing for transmitting the motion of the motor mechanism to the electrode supplying means, automatic devices for controlling the motor mechanism so as to vary the supply of electrode material in accordance with the conditions of the arc, means for utilizing the exhaust from the motor or some other source of fluid pressure to facilitate the action of the arc, and other minor details of construction, control and operation as hereinafter more fully described.

In the accompanying drawings:

Figure 3 is a plan view of the structure shown in Figure 1 taken on line 3—3.

Figure 4 is a sectional view taken on line 4—4 of Figure 1.

Figure 5 is an elevation of the same structure looking in the direction of the arrows 5—5 of Figure 1.

Figure 6 is a section on line 6—6 of Figure 3 showing details of the motor control mechanism.

Figure 7 is a section on line 7—7 of Figure 3 showing further details of the motor mechanism.

Figure 8 represents details of means for supplying fluid under pressure to the arc.

Figure 9 is an elevation partly in section showing a modified form of the invention.

Figure 10 is an elevation on line 10—10 of Figure 9.

Figure 11 is an elevation on line 11—11 of Figure 9.

Figure 12 represents a wiring diagram illustrating a possible arrangement of circuits applicable to the operation and control of the welding head.

Figure 13 represents another modified form of the invention, with parts in section on line 13—13 of Figure 14. Figure 14 is a plan view of the structure shown in Figure 13, details of the valve mechanism being shown in section, and Figure 15 is a section on line 15—15 of Figure 14.

Figure 1:
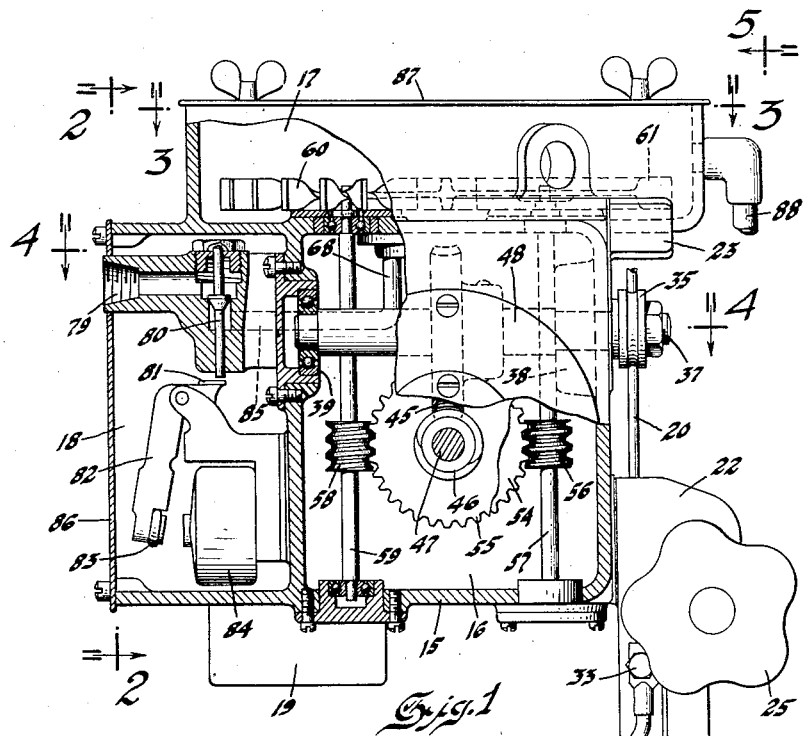
Figure 1 represents a so-called "welding head" embodying features of the invention, parts being broken away to show internal details.
Figure 2:
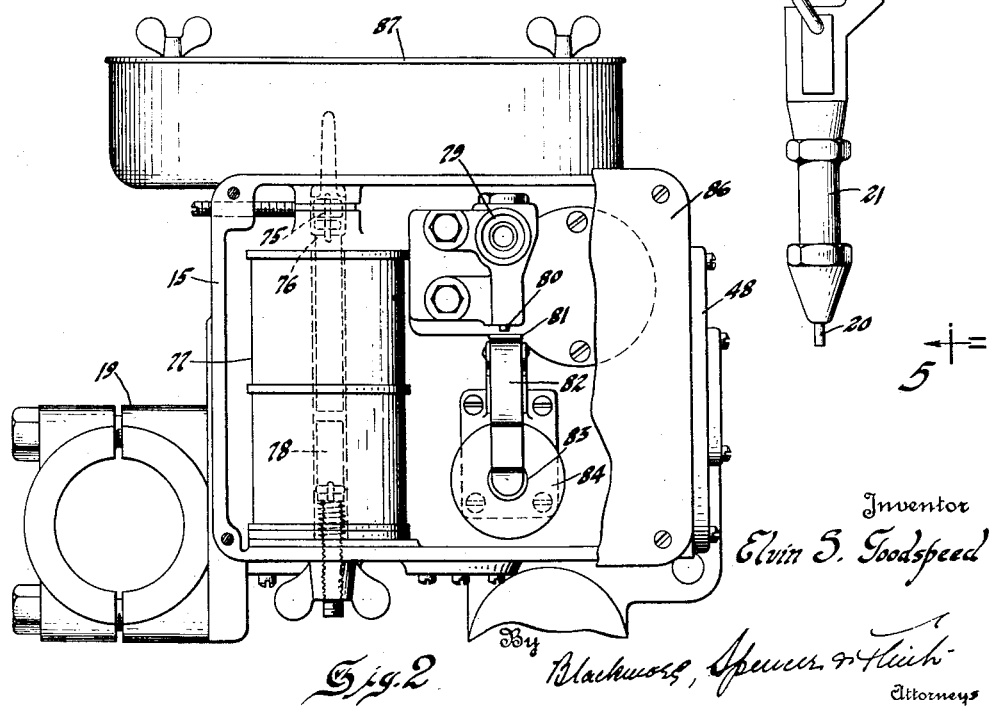
Figure 2 is an elevation of the mechanism shown in Figure 1 taken on line 2—2 of Figure 1.

Referring to the drawings, 15 indicates a frame or casing arranged to support and enclose various moving parts of the mechanism. As illustrated, the casing provides three chambers indicated respectively by 16, 17 and 18. The first of these chambers encloses the gearing whereby the electrode supplying devices are driven, the second encloses a penumatic motor mechanism whereby the gearing is actuated and the third chamber encloses certain of the motor controlling accessories. The frame or casing 15 may be provided with suitable means such as the clamp 19 whereby the welding head may be secured to and supported upon any usual or suitable type of machine support which may be either stationary or movable, in accordance with the character of work which the welding head is designed to perform.

The fusible electrode material which is to be supplied continuously to the electric arc, is indicated at 20. It may be drawn from any suitable source of supply, such as a reel or roll, or it may be provided in relatively short lengths in the form of strips or rods. This material, which will be hereinafter referred to as the "electrode", is directed to the point where the arc is to be produced through a guide member 21, which is preferably angularly adjustable, and through relatively fixed guides 22, 23. Angular adjustment of the guide member 21 is provided by means of a screw 24 manually rotatable by a handle 25. The screw passes through a fixed abutment 26 secured to the frame 15 and through a cylindrical nut 27 journalled in an extension 28 fixed to the upper portion of the guide member 21. The intermediate portion 29 of the member is pivoted at 30 to the guide 22. By adjustment, therefore, of the screw 24, the member 21 may be adjusted angularly about the pivot 30 thereby changing to some extent the direction of feed of the electrode 20, and accommodating the electrode to varied requirements in regard to position or angular location of the work.

Electric current is supplied to the electrode, preferably at some point as near as may be convenient to the lower end of the electrode. As illustrated, two flexible leads 31, 32 are shown connected at one end to binding posts 33, 34 to which other conductors may be connected leading from a suitable source of current. The leads 31, 32 are in conductive relation with the guide member 21 with which the electrode contacts as it is fed to the arc. Any usual or suitable means such as brushes or friction blocks may be utilized to improve the contact between the electrode and the guide.

In order to feed the electrode continuously through the guiding device, it is engaged at a point between the guides 22 and 23 by a grooved roller 35 and by an additional roller 36. The roller 35 is mounted upon the end of a shaft 37 journalled in bearings 38, 39 in the walls of the chamber 16. The roller 36 is journalled upon pin 40 carried by block 41 slidably supported in the casing 42 secured to the frame 15. The block 41 is impelled toward the roller 35 by yieldable means such as the spring 43, the tension of which is adjustable by the screw 44. The frictional contact between the electrode 20 and the roller 35 necessary to cause the feeding of the electrode by rotation of the roller is, therefore, readily obtained by suitable adjustment of the screw 44.

The gearing in chamber 16 arranged to drive the shaft 37, comprises a worm wheel 45 mounted on the said shaft and actuated by the worm 46 mounted on the shaft 47 which is arranged at right angles to shaft 37 and is journalled in bearings, one of which is supported by one wall of the chamber 16 and the other is supported in a cover plate 48 closing one end of said chamber. The shaft 47 also has secured thereto so as to rotate therewith a differential cage or carrier 49 supporting rotatable pinions 50, 51. Upon one side of the differential carrier is a pinion 52 and upon the other side a pinion 53 which pinions mesh with the pinions 50, 51, on the differential carrier. A worm wheel 54 is rigidly connected to the pinion 52 and another worm wheel 55 is similarly connected to pinion 53. The worm wheels 54 and 55, together with the pinions 52 and 53, are supported upon the shaft 47 but are free to rotate thereon. The worm wheel 54 is arranged to be driven by a worm 56 mounted upon the motor shaft 57 and the worm wheel 55 is similarly driven by a worm 58 mounted upon the motor shaft 59. The shafts 57 and 59 are supported in bearings on the walls of the chamber 16 and at one end project through the wall of the chamber 16 into the chamber 17.

In this chamber 17 are arranged motor devices adapted to cause rotation of the shafts 57 and 59 in opposite directions. These may take the form of fluid actuated motor devices such as impeller wheels 60 and 61, the wheel 60 being secured to the end of shaft 59 and the wheel 61 similarly secured to the end of shaft 57. These impellers are preferably of relatively light construction so as to offer slight resistance to changes of velocity and may, as illustrated be formed merely from a disc of sheet material.

Between the two impellers, which at one point are closely adjacent, is mounted a partition plate 62 adapted to provide channels through which the blades of the impeller wheels move when the wheels are rotated. A nozzle 63 is so positioned as to direct a current of fluid, preferably gaseous, into the channels formed by the partition plate 62. The nozzle, which is shown in detail in Figure 7, is pivotally supported upon a conical bearing 64 and a conical setscrew 65 by the adjustment of which the nozzle may be held properly seated upon the conical surface of the bearing 64. The bearing 64 is provided with a bore 66 communicating with the hollow interior 67 of the nozzle 63 so that fluid under pressure supplied to the bore 66 through the pipe 68 may be supplied to the nozzle in any position of the latter on its pivotal support.

A double arm lever 69 is rigidly secured to the nozzle 63 one arm of which is connected to a spring 70, the tension of the spring being adjustable by means of the setscrew 71. The other arm of the lever 69 is connected by the link 72 to one arm of an elbow lever 73 (Figure 6) extending into the chamber 17 from the chamber 18. The lever 73 is pivoted at 74 and the end in the chamber 18 is connected by a link 75 to the core 76 of an electromagnet 77. An adjustable stop 78 may be provided for the purpose of limiting the movement of the core 76 in the direction of the electromagnet. The position of the nozzle and the resultant relative effect of the blast upon the two impellers will obviously depend upon the relation between the force exerted by the solenoid and that exerted by the spring.

Fluid may be supplied under pressure to the pipe 68 leading to nozzle 63 through an automatic valve, as illustrated in Figure 1. This device comprises a conduit 79 in which is located a check valve 80. The spindle of this valve extends outwardly from the valve casing in position to be operated upon by an abutment 81 on the elbow lever 82. The other end of the lever 82 carries an armature 83 so positioned as to be attracted by the electromagnet 84 when current is supplied to the latter.

Fluid under pressure admitted past the valve 80 may flow through the passage 85 to the pipe 68 and thence to the nozzle 63. The chamber 18 may be enclosed by a cover plate 86 and the chamber 17 may be similarly enclosed by a cover plate 87 so as to form a fluid tight enclosure for the impeller wheels. As noted above, the pressure medium employed for actuating the impeller wheels may be a suitable fluid, preferably gaseous. Air, for example, may be taken from any source of air under pressure and supplied through the conduit 79. Other fluids, however, may be utilized, especially if the exhaust from the motor chamber 17 is to be used for some purpose having special relation to the operation of the arc. For this purpose, the exhaust from chamber 17 may be led through pipe 88 to a point of utilization such as illustrated in Figure 8. As there shown, a nozzle 89 is supported, as by a spherical joint 90, in adjustable relation to the electrode 20 and a work piece 91.

A blast of gas supplied by the exhaust from chamber 17 or, if desired, from any other suitable source of the desired fluid, may be directed upon the electrode 20 closely adjacent to the point of fusion. The principal advantage and purpose of such blast is to prevent the deposit or collection of particles from the fused or fusing materials upon the unfused portion of the electrode. The maintaining of the electrode clean in this way is found to result in a material improvement in the uniformity and steadiness of the arc.

An arrangement of electric circuits suitable for operation of the devices described, is shown in Figure 12. As there illustrated, a conductor 92 is arranged to supply welding current to the nozzle 21, the circuit being completed through the electrode 20 and work piece 91 through the conductor 93. A shunt circuit 94 connects the leads 92 and 93 through the solenoid or electromagnet 77 and an adjusting rheostat 95. A control circuit 96 with a control switch 97, including in the circuit the solenoid or electromagnet 84, is arranged in any usual or suitable manner to control the starting and stopping of the welding operation. It is usual, of course, for the control circuit to be connected to actuating devices for opening and closing the main welding circuit which, being well known, are not illustrated.

The operation of the mechanism thus far described is as follows:

Upon closing the control switch 97, the flow of the welding current to the electrode 20 is initiated and the flow of pressure medium to the nozzle 63 is also permitted by the action of the solenoid 84 which opens the valve 80. If the nozzle 63 is so positioned that it directs pressure fluid with equal effect upon both of the impeller wheels 60 and 61, the latter will be caused to rotate at equal velocities. The impeller 60 will therefore drive, through shaft 58, worm 57 and worm wheel 55, the pinion 53 in one direction while the impeller 61 will drive, through shaft 51, worm 56 and worm wheel 54, the pinion 52 causing it to rotate at the same rate as pinion 53 but in the opposite direction. The gear carrier 49 will therefore remain stationary and shaft 47 will remain fixed, hence there will be no rotation of the feed roller 35 and the electrode 20 will remain stationary. If, however, the nozzle 63 is not positioned exactly midway between the impellers 60 and 61, it will cause a larger amount of pressure fluid to be delivered to one of the wheels than to the other, thereby causing a differential movement of the two trains of gearing and the corresponding rotation in one direction or the other of the gear carrier 49, the shaft 47, worm wheel 45, shaft 37 and feed roller 35. The control elements, including the solenoid 77 and rheostat 95 in the shunt circuit 94 and the tension of the spring 70, are so adjusted that if the resistance in the main welding circuit at the arc is greater than that desirable for proper operation, the feed devices will be so actuated as to cause the electrode to be advanced in the direction of the work, thereby shortening the arc or lowering the resistance, and on the other hand, if the resistance of the arc is too small, as upon drawing the arc or when the electrode has been brought too near the work, then the feed devices would be actuated in a direction to cause retraction of the electrode, thereby either drawing the arc as upon starting or re-adjusting the length of the arc to that necessary for best operation.

The pneumatic motor herein described is extremely sensitive to changes in the position of the nozzle which directs the blast upon the impeller wheels. Furthermore, the impeller devices and the trains of gearing driven thereby are normally constantly acting in one direction with only a slight variation in speed. The only part whose direction of rotation has to be reversed is the feed shaft 37 and the shaft 47 with the differential carrier 49. As these parts rotate very slowly, they develop very little inertia and the feed mechanism is therefore highly sensitive to changes in the conditions in the arc.

In Figures 9, 10 and 11, I have illustrated a simplified construction including a single impeller wheel 100. This wheel is mounted on a shaft 101 carrying a worm 102 engaging the worm wheel 103. This latter wheel is mounted on a shaft 104 carrying a worm 105 arranged to drive a worm wheel 106 on the feed shaft 107. A feed roller 108 on shaft 107 may be arranged to feed an electrode in the same manner as does the feed roller 35 of the form first described. Two nozzles 109 and 110 are arranged to direct blasts of air or other pressure medium upon the impeller wheel on opposite sides of the axis thereof. These two nozzles are combined into a unitary structure having a body 111 pivotally supported in a manner similar to the support of the nozzle 63 of the form first described. Pressure medium supplied through the conduit 112 is therefore directed through the nozzles 109 and 110 in such manner that the impeller wheel either remains stationary, as when the two blasts of pressure medium have exactly the same rotative effect on the impeller, or cause the impeller to rotate in one direction or the other as the nozzles change their angular position relative to the impeller.

Such change in position is effected in a manner similar to that previously set forth, as by the action of a spring 113, connected to an arm 114 on the nozzle body 111 and adjustable by a screw-threaded connection 115, and by the action of the core 116 connected by a link 117 to another arm 118 on the valve body 111. The core 116 is under the influence of the solenoid or electromagnet 119 which is arranged to be controlled by the changing conditions in the arc, as in the form first described. In this case, the single impeller 100 actuates through the train of gearing 102, 103, 105 and 106, the feed shaft 107. Hence the electrode, in engagement with the feed roller 108, is caused to remain stationary or to move toward or from the work in exact accordance with the changes in position of the nozzles 109, 110, which in turn are responsive to changing conditions in the arc.

In Figures 13 and 14, I have shown another type of control device whereby the flow of pressure medium through two conduits may be controlled in accordance with conditions in the arc. This mechanism is adapted, for example, to the control of the supply of pressure medium to two nozzles acting upon one or more impellers and adapted to vary the effect of the blast through the nozzles in accordance with the changes in position of one or more valve members.

As illustrated, this mechanism comprises a casing 115′ in which is positioned the impeller 116′. A valve chamber 117′ communicates with the impeller chamber through passages 118′, 119′ adapted to direct blasts of gaseous medium upon the impeller on opposite sides of its axis. The medium is supplied to the valve chamber from inlet 120 and its access to the passages 118′, 119′ is controlled by two valves 121, 122. Each valve comprises a cylindrical body portion having a conical end engaging with a correspondingly shaped valve seat or with an apertured metering plate, as shown respectively at the left and the right of Figure 14. A groove 123 provides a passage through which air or the like may flow from inlet 120 to the valve seats. At their inner or adjacent ends the valves are cut away to form facing recesses 124 in which engages a lever 125. This lever is carried by a shaft 126 to which is secured a double armed lever 127. One arm of the lever is influenced by spring 128 the tension of which is adjusted by screw 129. The other arm of the lever is connected to the armature or core 130 of solenoid 131 which may be arranged, as in the forms previously described, to be affected by changes in the welding arc.

In this embodiment of the invention, air supplied to the valve chamber 117′ is discharged upon the impeller blades through one or the other of the passages 118′, 119′, depending upon the positions of the valves 121, 122. It will be noted that the recesses 124 are of such length that each valve may slide to some extent independently of the other. For example, as the lever 125 swings toward the right, (Figure 14) it first permits valve 122 to close which valve will thereafter be held to its seat by the pressure of the gas. Further movement of the lever will raise valve 121 from its seat. Assuming that this position corresponds to a direction of rotation of the impeller to feed the electrode toward the work, the further control of the valve will permit a greater or less flow of pressure medium exactly as required by the fusing of the electrode.

It will be understood that various changes in details of construction and operation may be made without departing from the spirit and scope of the invention and, therefore, I do not wish to be restricted to the features herein specifically described except as required by the language of the appended claims in view of the prior art.

I claim:

1. Electrode feeding device comprising means for engaging and feeding an electrode, fluid-pressure motor mechanism comprising nozzle means arranged to drive said feeding means, means for supplying pressure medium to said mechanism and means responsive to conditions in the arc for controlling the position of said nozzle means to vary the rate of actuation of said feeding means.

2. Electrode feeding means comprising means for engaging an electrode and advancing it toward an arc, a fluid-pressure actuable rotary impeller arranged to drive said advancing means, means including a nozzle for directing a blast of gaseous medium upon said impeller and means responsive to conditions in the arc arranged to change the position of said nozzle to vary thereby the direction of said blast.

3. Structure as set forth in claim 2 including spring means for moving the nozzles in one direction and a solenoid in shunt with the welding current arranged to move the nozzle in the opposite direction.

4. Electrode feeding means comprising means for engaging an electrode and moving same either toward or from an arc, pneumatic motor means for driving said electrode moving means, and means responsive to conditions in the arc arranged to vary the supply of pressure medium to said motor means to vary thereby the direction and rate of travel of said electrode.

5. A fusible electrode arc welding apparatus comprising means for feeding an electrode either toward or from the arc, and fluid actuable means for actuating said feeding means comprising a rotary impeller, means for directing blasts of gaseous fluid upon said impeller tending to drive it in opposite directions, and means for varying the relative effect of said blasts so as to cause rotation of said impeller in one direction or the other, said means being responsive to varying conditions in the arc.

6. Electric arc welding apparatus comprising means for feeding an electrode to the arc, fluid-pressure actuable motor mechanism arranged to drive said feeding means, means for supplying welding current to said arc, and means for simultaneously initiating the supply of current to said arc and the supply of fluid to said motor mechanism comprising a valve controlling supply of pressure medium to said motor, an electromagnet adapted to be energized upon supply of current to said arc and means actuated by said electromagnet for actuating said valve.

7. Electrode feeding means comprising means for engaging an electrode and advancing it toward an arc, air pressure actuable means for actuating said advancing means, and means for directing air from said last-mentioned means upon said electrode above the arc whereby spray from the arc is deflected from the electrode.

8. Electric welding apparatus comprising means for feeding a fusible electrode to an electric arc, an air pressure actuable motor, driving means connecting said motor to said feeding means, means for collecting the exhaust from said motor and means for directing the air from said exhaust upon the said electrode.

9. Electrode feeding mechanism comprising a device for moving said electrode toward or from an arc, means adapted and arranged to actuate said device at variable rates in either direction, said means comprising a variable speed rotary fluid pressure motor and gearing connecting said motor to said device, and means responsive to conditions in the arc for varying the speed of said motor.

10. Electrode feeding means for electric arc mechanism comprising an electrode feeding device adapted to engage an electrode and move it toward or from the arc, a rotary fluid pressure motor, speed reducing gearing providing a constant driving connection between said motor and said device, means for reversing said motor and for actuating same at varying speeds responsive to conditions in the arc.

11. Electrode feeding means for electric arc mechanism comprising an electrode engaging and moving device, a rotary fluid pressure motor, speed reducing gearing connecting said motor to said device and controlling means adapted to vary the rate of movement of said motor in response to conditions in the arc, said motor and gearing arranged to actuate said device, either toward or from the arc or to hold said device stationary without interrupting supply of fluid pressure medium to said motor.

12. In electrode feed mechanism, electrode actuating means, a pair of impellers actuable by fluid pressure medium, a gearing element for each impeller driven at a rate proportional to the rate of the corresponding impeller, another gearing element driven at a rate proportional to the difference between the rates of the first-mentioned elements, and a driving connection between said last-mentioned element and said electrode actuating means, including nozzle means positioned to direct fluid pressure medium upon both of said impellers and means responsive to conditions in the arc for changing the proportionate fluid pressures exerted upon the impellers through the nozzle means.

ELVIN S. GOODSPEED.